United States Patent [19]

Spencer et al.

[11] Patent Number: 5,315,491
[45] Date of Patent: May 24, 1994

[54] REFLECTING AND LUMINOUS LAYERED MATERIAL

[75] Inventors: Andrew B. Spencer, Manchester; Richard J. Guastamachio, Broad Brook; Bryan D. Marsh, South Windsor, all of Conn.

[73] Assignee: American Ingenuity, Inc., Bloomfield, Conn.

[21] Appl. No.: 19,152

[22] Filed: Feb. 17, 1993

Related U.S. Application Data

[63] Continuation-in-part of Ser. No. 954,387, Sep. 30, 1992.

[51] Int. Cl.$^5$ .............................................. F21V 9/16
[52] U.S. Cl. ...................................... 362/84; 362/34; 362/267; 362/339; 313/114; 313/512
[58] Field of Search .............. 313/114, 512; 362/29, 362/30, 34, 84, 267, 339

[56] References Cited

U.S. PATENT DOCUMENTS

| | | | |
|---|---|---|---|
| 1,319,123 | 10/1919 | Simon | 446/219 |
| 1,373,783 | 4/1921 | Willis | 250/467.1 |
| 1,454,755 | 5/1923 | Matisse et al. | 205/50 |
| 2,333,641 | 11/1943 | Corwin | 250/467.1 |
| 2,910,792 | 11/1959 | Pfaff, Jr. | 40/582 |
| 3,012,164 | 12/1961 | Franzone et al. | 313/483 |
| 3,260,846 | 7/1966 | Feuer | 250/467.1 |
| 3,452,464 | 7/1969 | Robinson | 40/542 |
| 3,583,298 | 6/1971 | Van Swearingen | 40/542 |
| 3,584,216 | 6/1971 | Tinney | 250/486.1 |
| 3,591,942 | 7/1971 | Van Swearingen | 40/615 |
| 3,684,348 | 8/1972 | Rowland | 359/530 |
| 3,689,346 | 9/1972 | Rowland | 156/245 |
| 3,698,295 | 10/1972 | Van Swearingen | 95/1 |
| 3,757,730 | 9/1973 | Douglas | 116/28 R |
| 3,758,190 | 9/1973 | Douglas | 359/525 |

(List continued on next page.)

FOREIGN PATENT DOCUMENTS 76103063 2/1982 Taiwan .

OTHER PUBLICATIONS

Hanovia Technical Bulletin, "Spot-Lite" Glow-in-the-Dark Films, Seris 4100 CLL and Series 4400 CLL, Technical Data Sheet #20, Nov. 1, 1988, 4 pages.

Product Bulletin, "Reflexite" Reflective Material, Reflexite Corporation, Nov. 1987, 2 pages.
Guide Specification, "Reflexite" Reflective Material, Reflexite Corporation, May 1990, 1 page.
Loctite Luminescent Systems Inc. product brochure (copyright 1989)–6 pages.

*Primary Examiner*—Ira S. Lazarus
*Assistant Examiner*—Alan B. Cariaso
*Attorney, Agent, or Firm*—Perman & Green

[57] ABSTRACT

Reflecting and luminous layered material is provided which combines the advantages of a light reflective component and a luminescent component. The material includes a first layer of prismatic light reflective plastic material having an underlying surface formed with a plurality of minute prism-like formations projecting therefrom at regular spaced intervals and an overlying substantially smooth light transmissive surface. The material also includes a second layer of plastic luminescent material attached to the underlying surface of the prism-like formations. The layers are joined at a first region as by heat sealing, ultrasonic welding, sewing, or stapling into a unitary structure such that the prism-like formations are substantially destroyed. A second region is thereby defined at which the first layer and the second layer are physically distinct. An electroluminescent lamp is received in the second region and can be selectively energized. When the lamp is energized, its light radiates through the underlying surface of prism-like formations and through the smooth light transmissive surface. Simultaneously, reflected light from the prism-like formations partially energizes the second layer of luminescent material. When the lamp is deenergized, phosphorescent light radiates from the second layer through the underlying surface of prism-like formations and through the smooth light transmissive surface. Other embodiments are disclosed which can be tailored to a variety of applications.

17 Claims, 4 Drawing Sheets

U.S. PATENT DOCUMENTS

| | | | |
|---|---|---|---|
| 3,766,881 | 10/1973 | Ward | 116/63 P |
| 3,810,804 | 5/1974 | Rowland | 156/245 |
| 3,830,682 | 8/1974 | Rowland | 428/142 |
| 3,871,336 | 3/1975 | Bergman | 359/516 |
| 3,893,795 | 7/1975 | Nauta | 425/403 |
| 3,935,359 | 1/1976 | Rowland | 428/172 |
| 3,944,835 | 3/1976 | Vosburgh | 250/487.1 |
| 3,952,690 | 4/1976 | Rizzo et al. | 116/63 P |
| 3,975,083 | 8/1976 | Rowland | 359/514 |
| 3,992,080 | 11/1976 | Rowland | 359/533 |
| 4,016,665 | 4/1977 | Sakota | 40/582 |
| 4,032,791 | 6/1977 | Chiola et al. | 250/483.1 |
| 4,194,809 | 3/1980 | Campagna, Jr. | 359/520 |
| 4,250,646 | 2/1981 | Trachtenberg | 40/582 |
| 4,328,533 | 5/1982 | Paredes | 362/108 |
| 4,349,598 | 9/1982 | White | 428/161 |
| 4,377,750 | 3/1983 | Pape et al. | 250/458.1 |
| 4,401,050 | 8/1983 | Britt et al. | 116/205 |
| 4,403,565 | 9/1983 | Bleiweiss et al. | 116/63 T |
| 4,440,104 | 4/1984 | Bleiweiss et al. | 116/63 T |
| 4,497,126 | 2/1985 | Dejean | 40/124.1 |
| 4,555,161 | 11/1985 | Rowland | 359/530 |
| 4,637,950 | 1/1987 | Bergeson et al. | 428/168 |
| 4,676,595 | 6/1987 | Danker | 359/523 |
| 4,712,319 | 12/1987 | Goria | 36/137 |
| 4,713,577 | 12/1987 | Gualtieri et al. | 313/468 |
| 4,801,193 | 1/1989 | Martin | 359/518 |
| 4,844,990 | 7/1989 | White | 428/690 |
| 4,875,799 | 10/1989 | Harrison | 404/12 |
| 4,922,585 | 5/1990 | Suzuki et al. | 24/381 |
| 4,928,414 | 5/1990 | Bright | 40/551 |
| 5,009,019 | 4/1991 | Erlendsson et al. | 40/541 |

REFLECTING AND LUMINOUS LAYERED MATERIAL

This is a continuation-in-part of U.S. application Ser. No. 07/954,387 of Andrew B. Spencer et al. filed Sep. 30, 1992 and entitled "Layered Reflecting and Luminous Material".

BACKGROUND OF THE INVENTION

I. Field of the invention

The present invention relates to flexible layered material which is simultaneously self luminating and capable of reflecting light from an outside source. In one embodiment, the material may be in sheet form comprising an overlying layer of prismatic light reflecting material and an underlying layer of luminescent material in which the latter can be selectively energized to become luminous. The material functions independently of a change in its surroundings, such as the presence or absence of an external light source, and will continue to be fully operational even when the surroundings change.

II. Description of the Prior Art

Various reflective materials are commonly employed for safety and decorative purposes. One of the most common principles employed is simply to apply a reflective coating upon a surface of the item or to construct the item of a highly reflective material such as polished metal. In addition to reflective coatings and specular surfaces, it is also common to use structures which have upon one or both surfaces various formations which reflect the light rays impinging thereon, either principally as a result of the steepness of the angle at which the light ray impinges the surface or by virtue of reflective coatings on the surface of the formations.

There has been a constant demand for retroreflective materials, i.e. materials capable of reflecting the bulk of the light rays impinging thereon in a substantially parallel path back toward the source of the light. Minnesota Mining and Manufacturing Company has sold a material under the trademark SCOTCHLITE which relies upon minute glass spheres embedded in a matrix of synthetic resin to provide such retroreflection. Another type of retroreflective element has been a molded member having cube corner formations on one surface thereof, such molded members being formed from glass or synthetic plastic.

Cube corner reflectors molded from glass and more recently from acrylic resins have commonly been employed as safety devices on bicycles, automobiles and other vehicles. Although it had long been suggested that the cube corner might be of small dimension until the advent of the U.S. Pat. No. 3,684,348, to Rowland, generally such formations were of appreciable size. Furthermore, the nature of the material from which reflectors were fabricated resulted in structures which were relatively rigid in character and which did not lend themselves either to shaping to various substrates of nonplanar character or to use as a fabric which might be worn. Moreover, it came to be recognized that as the size of the cube corner formations is reduced, criticality in control of angles and dimensions becomes far more acute since even a minute deviation will produce a substantial deviation in the capability of the material to retroreflect light rays impinging thereon.

The Rowland patent represented a significant advancement in the field of reflective materials. That patent discloses a retroreflective composite synthetic plastic material comprised of a body portion having substantially smooth surfaces on opposite sides thereof and a large number of minute cube corner formations closely spaced about and projecting from one of the smooth surfaces. The cube corner formations each have three faces and a base adjacent the body portion with a side edge dimension said to be not more than 0.025 inch and preferably less than 0.010 inch and the close spacing avoids any substantial smooth areas therebetween. The body portion and the cube corner formations are separately formed from essentially transparent synthetic plastic resin and are bonded together into a composite structure wherein those light rays entering into the material through the opposite surface of the body portion predominately pass through the body portion and into the cube corner formations by which they are reflected back through the composite structure substantially parallel to the path of entry.

In the most conveniently formed structure of the patented concept, each cube corner formation has one face parallel to one face of every other cube corner formation. Preferably, the cube corner formations are substantially equal in size and arranged in a pattern of rows and columns. The center-to-center spacing between cube corner formations in every row and between cube corner formations in every column is in accordance with a uniform pattern to insure close spacing of the formations and good retroreflection. The apex of each cube corner formation is in alignment with the apices of all of the cube corner formations located in the pattern row and column in which it is disposed, and each apex is vertically aligned with the center of its base.

To provide optimum reflectivity, the composite material has a reflective coating deposited on the cube corner formations. An adhesive layer may then be provided on the reflective coating and a removable piece of sheet material loosely adhered to the adhesive layer. This self-adherent composite structure may be readily used since the sheet material may be removed to adhere the retroreflective sheet material to a substrate. In the optimum form, either with or without an adhesive coating, the reflective coating is metallic and the structure includes a layer of resin deposited on the metallic coating to provide protection therefor. In the absence of a protective resin layer, it is customary to provide an integral, non-removable backing sheet to provide protection for the cube corner formations which can be easily damaged. The backing sheet also serves to enhance the reflectability of the cube corner formations.

Over the years, there have also been significant advances in the use of luminous materials for compositions to provide visibility at nighttime or in locations in which little or no light is available or permissible. Throughout this disclosure, the expression "luminous material" or "luminous composition" is intended to include any material or composition which has phosphorescent, fluorescent, and/or auto luminescent properties. An early disclosure of a luminous device is provided in U.S. Pat. No. 1,373,783 to Willis which discloses a glass plate mounted in a metal holder with a layer of luminous powder compressed between the glass plate and the holder. In a further development disclosed in U.S. Pat. No. 2,333,641 to Corwin, luminous adhesive sheet or tape material is disclosed. In this instance, a sheet of cellulose film is provided with a permanently tacky, pressure-sensitive, adhesive coating containing a luminous material. The coating is applied to one surface of the sheet or tape and is visible through the sheet or tape when the latter is applied to a supporting object.

Still another disclosure of a luminous structure is provided in U.S. Pat. No. 3,260,846 to Feuer which discloses a light source utilizing the beta ray energy of a radioactive material characterized by having a front phosphor region of sufficient depth to absorb the emitted beta rays but not the light generated by the radioactive excitation of the phosphor particles. It includes a back heavy metal reflecting region which, due to the high atomic number, at least 45, serves to back scatter the beta particles as well as reflect light. The reflected beta particles then further excite the forward phosphor regions and ultimately this energy is discharged from the system in a form of light energy.

A more recent development is a phosphorescent type material produced and sold by Hanovia Division of Conrad Inc. of Newark, N.J. under the trademark "SPOT-LITE". In this instance, the luminescent material is of flexible vinyl plastic film which absorbs energy from any light source to which it is exposed, whether natural sunlight, or artificial incandescent or fluorescent light, and chemically generates a luminous light in response thereto. The film produces an intense bright green glow which is visible in absolute darkness for a duration of approximately thirty minutes. After that period of time, even though eighty to eighty-five percent of its luminosity will have diminished, it continues to exhibit a visible glow for up to an additional eight hour period of time. Nonetheless, after exposure of three to ten seconds of ambient light, the film can be recharged to its maximum capacity.

Still more recently, in commonly assigned U.S. application Ser. No. 07/890,391 filed May 26, 1992 entitled "Visibility Enhancing Material", A. Spencer et al. disclosed flexible visibility enhancing material which combines the advantages of a light reflective component and a luminescent component. The material includes a first layer of prismatic light reflective plastic material having an underlying surface formed with a plurality of minute prism-like formations projecting therefrom at regular spaced intervals and an overlying substantially smooth light transmissive surface. Bonded as by heat sealing to the first layer is a second layer of plastic luminescent material contiguously and integrally attached to the underlying surface of prism-like formations and generally coextensive therewith. The visibility enhancing material simultaneously radiates luminescent light from the second layer through the underlying surface of prism-like formations and through the smooth light transmissive surface and reflected light from the prism-like formations through the smooth light transmissive surface.

The combination of the two vinyl layers thereby created a new material which had the characteristics of both. The retroreflective phosphorescent type material of the invention reflected light back in the direction of its source and also produced its own light in conditions of subdued light and total darkness. This unique combination enabled the material of the invention to be visible when light was shined onto it, and also when the light source was extinguished entirely. Additionally, the visibility enhancing material of the invention was visible under extreme variations and lighting conditions, including total darkness. This was an unexpected phenomenon since the construction of the retroreflective material disclosed in U.S. Pat. No. 3,684,348 and marketed under the trademark "REFLEXITE" was not previously known to be transparent or translucent to any substantial extent. It was reflective of light shined onto it, but was not known for any characteristic which would enable transmission of light from a second source on a side opposite the source being reflected. Another unexpected phenomenon provided by the material of the invention was that the life expectancy of the radiance from the luminescent material had been found to be substantially extended.

In a further development, as disclosed in commonly assigned U.S. application Ser. No. 07/890,392 filed May 26, 1992 entitled "Material With Enhanced Visibility Characteristics", the underlying layer of luminescent material can be selectively energized to become luminous.

In still a further development, as disclosed in commonly assigned U.S. application Ser. No. 07/954,387 filed Sep. 30, 1992 entitled "Layered Reflecting and Luminous Material", the layers of prismatic light reflecting material and luminescent material are joined at a first region of finite width as by heat sealing, ultrasonic welding, sewing, or stapling into a unitary structure such that the prism-like formations are substantially destroyed. A second region is thereby defined at which the first layer and the second layer are physically distinct. In the second region, the layered material simultaneously radiates luminescent light from the second layer through the underlying surface of prism-like formations through the smooth light transmissive surface and reflected light from the prism-like formations through the smooth light transmissive surface of the first layer. Only phosphorescent light radiates from the first region. In another embodiment of that invention, the second layer may be replaced with a layer of luminescent material which can be selectively energized to become luminous.

SUMMARY OF THE INVENTION

The present invention is considered to be an improvement over the material disclosed in application Ser. No. 07/954,387. It was, therefore, with knowledge of the foregoing that the present invention was conceived and has now been reduced to practice.

According to the invention, reflecting and luminous layered material is provided which combines the advantages of a light reflective component and a luminescent component. The material includes a first layer of prismatic light reflective plastic material having an underlying surface formed with a plurality of minute prism-like formations projecting therefrom at regular spaced intervals and an overlying substantially smooth light transmissive surface. The material also includes a second layer of plastic luminescent material attached to the underlying surface of the prism-like formations. The layers are joined at a first region as by heat sealing, ultrasonic welding, sewing, or stapling into a unitary structure such that the prism-like formations are substantially destroyed. A second region is thereby defined at which the first layer and the second layer are physically distinct. An electroluminescent lamp is received in the second region and can be selectively energized. When the lamp is energized, its light radiates through the underlying surface of prism-like formations and through the smooth light transmissive surface. Simultaneously, reflected light from the prism-like formations partially energizes the second layer of luminescent material. When the lamp is deenergized, phosphorescent light radiates from the second layer through the underlying surface of prism-like formations and through the smooth light transmissive surface. Other embodiments are disclosed which can be tailored to a variety of applications.

It is an object, therefore, of the invention to provide a unitary visibility enhancing material which combines the advantages of a light reflective component and a luminescent component but which in selected regions is self-luminous without being reflective.

It is another object of the invention to provide such a unitary visibility enhancing material which is flexible and capable of mounting on and shaping to surfaces of various configurations, including walls, buildings, signs, clothing, vehicles, and the like.

Still another object of the invention is to provide such a visibility enhancing material having an adhesive coating by which it may be conveniently adhered to a support surface.

A further object of the invention is to provide such a material which is inexpensive and can be readily produced using known materials. Yet another object of the invention is to provide such a composite material in which the life expectancy of the radiance from the luminescent material is substantially prolonged.

A further object of the invention is to provide flexible visible enhancing material which may be in sheet form comprising a layer of prismatic light reflecting material and an underlying layer of luminescent material in which the latter can be selectively energized to become luminous.

Yet another object of the invention is to provide a luminous safety material which has a self-contained power source and which maintains luminosity after the power source is extinguished or fails.

Yet a further object of the invention is the provision of such a luminous safety material which selectively produces either a constant light or a blinking light.

Still a further object of the invention is to provide such a luminous safety material whose ability to function is not dependent upon a change in its surroundings, such as the presence of an external light source, and will continue to be fully operational even when the surroundings change.

Yet another object of the invention is to provide a unitary material which offers the combined properties of all of the aforementioned individual materials and provides the maximum visibility output of each individual material without compromising any of the characteristics of the individual materials.

Other and further features, advantages, and benefits of the invention will become apparent in the following description taken in conjunction with the following drawings. It is to be understood that the foregoing general description and the following detailed description are exemplary and explanatory, but are not to be restrictive of the invention. The accompanying drawings which are incorporated in and constitute a part of this invention, illustrate one of the embodiments of the invention, and, together with the description, serve to explain the principles of the invention in general terms. Like numerals refer to like parts throughout the disclosure.

DETAILED DESCRIPTION OF THE ILLUSTRATED EMBODIMENTS

Figure 1:
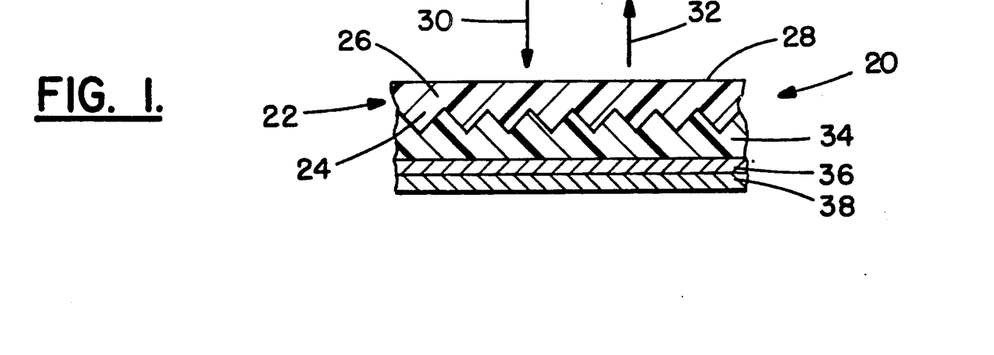
FIG. 1 is a fragmentary cross section view of flexible visibility enhancing material embodying the invention.

Turn now to the drawings and, initially, to FIG. 1 which illustrates, in section, flexible visibility enhancing material 20 embodying the invention. The material 20 is layered and may be of sheet or tape form. A first layer 22 of the material is comprised of prismatic light reflective material having an underlying surface formed with a plurality of minute prism-like formations 24 which project outwardly from a main body 26 at regular spaced intervals. The main body is also formed with an overlying substantially smooth light transmissive surface 28.

The first layer 22 may be substantially similar to the construction disclosed in U.S. Pat. No. 3,684,348, cited above, the disclosure of which is incorporated herein by reference in its entirety. As disclosed in that patent, the prism-like formations 24 are actually cube corner formations each of which has three planar faces which are disposed in planes perpendicular to each other and intersecting along their side edges. The apex of each such prism-like formation is vertically aligned with the center of the base. The formations 24 are arranged in a pattern providing rows and columns and the center-to-center spacing between the apices of the formations along the rows and columns is in accordance with a regular pattern to assure close spacing and avoid substantially any flat areas between them.

By reason of that configuration, a light ray 30 directed towards the surface 28, passes through the main body 26, then strikes one of the planar surfaces. The light ray is directed to a second of the planar surfaces, then to a third of the planar surfaces, after which it is directed out of the formation 24 in a return path indicated by a reflected light ray 32. The path of the reflected light ray 32 is substantially parallel to that of the light ray 30 before entering the main body 26. Indeed, this is the principle of retroreflection which is utilized by the material manufactured and sold by Reflexite Corporation of New Britain, Conn. under the trademark "REFLEXITE".

As noted in U.S. Pat. No. 3,684,348, a reflective coating overlying the prism-like formations 24 may be provided by a metallized synthetic plastic film which is brought into intimate contact with the surface of the cube corner formations. For purposes of the present invention, such a film is not used, however. In its place, a second layer 34 of luminescent material is applied to the prism-like formations 24 so as to be contiguously and integrally attached thereto and generally coextensive therewith. The second layer 34 is preferably of a vinyl material having luminescent qualities such as that mentioned above which is commercially available under the trademark "SPOT-LITE". The second layer 34 may be bonded to the formations 24 as by heat or ultrasonic sealing performed in such a manner that the quality of the prism-like formations is not compromised in any manner.

In one embodiment, a coating or layer 36 of a permanently tacky, pressure sensitive adhesive is deposited on the surface of the second layer 34 opposite the prism-like formations 24. Thereafter, a sheet of backing material 38, or release paper, is applied so as to overlie the adhesive 36 and is loosely adhered thereon. To mount this structure on a suitable surface, the sheet 38 is removed and the remaining composite material pressed thereagainst so that the adhesive coating will adhere thereto.

Supporting surfaces for the visibility enhancing material 20 of the invention are virtually limitless and, as noted above, may include walls, buildings, signs, clothing, vehicles, and a variety of other receiving surfaces. When so mounted, a surface 28 is an outermost surface and is first subjected to a primary light ray 30. Light rays 30 impinge upon the prism-like formations 24 and, with the aid of the second Layer 34 of luminescent material providing a reflective background, are redirected as reflected light rays 32. Simultaneously, in subdued light or under conditions of substantial darkness, the second layer 34 emits its luminescence through the prism-like formations 24 and through the first layer 22 and through the smooth light transmissive surface 2 to regions external of the material 20.

In use, it has been found that the material 20 of the invention is substantially as reflective as the unmodified REFLEXITE material, or equivalent, which is utilized in its construction. At the same time, the luminescence emitted by the material 20 of the invention is substantially the same as the unmodified "SPOT-LITE" material, or other similar luminescent material. Further, in this regard, experience has shown that the life expectancy of the radiance from the luminescent material is substantially extended. It is believed that the reflective material, overlying the luminescent material, serves to protect the chemical content of the luminescent material such that the decay of its luminous glow is substantially reduced.

As an added benefit, the first layer 22 may be available in a wide assortment of colors including white, yellow, orange, blue, and red, for rendering further enhanced visibility to an underlying structure.

Figure 2:
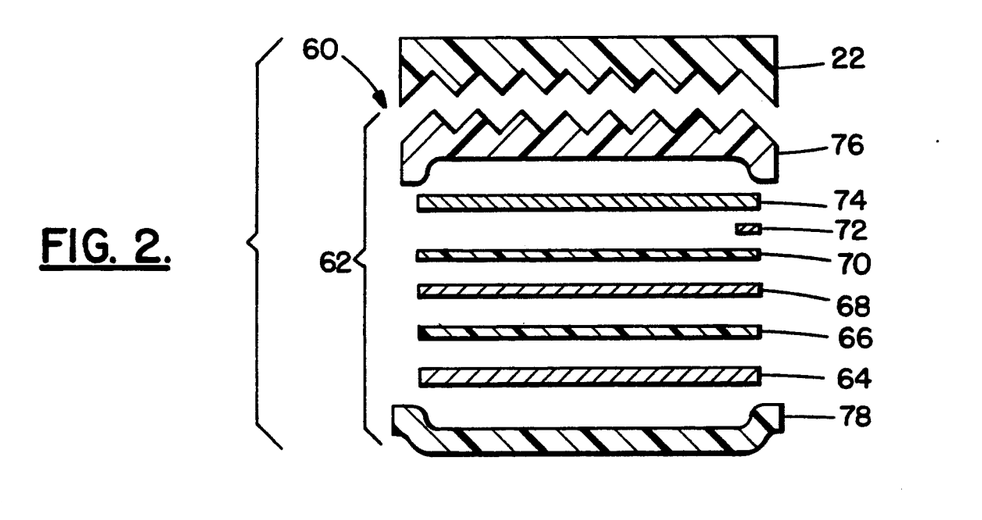
FIG. 2 is an exploded cross section view of another embodiment of the flexible visibility enhancing material.
Figure 3:
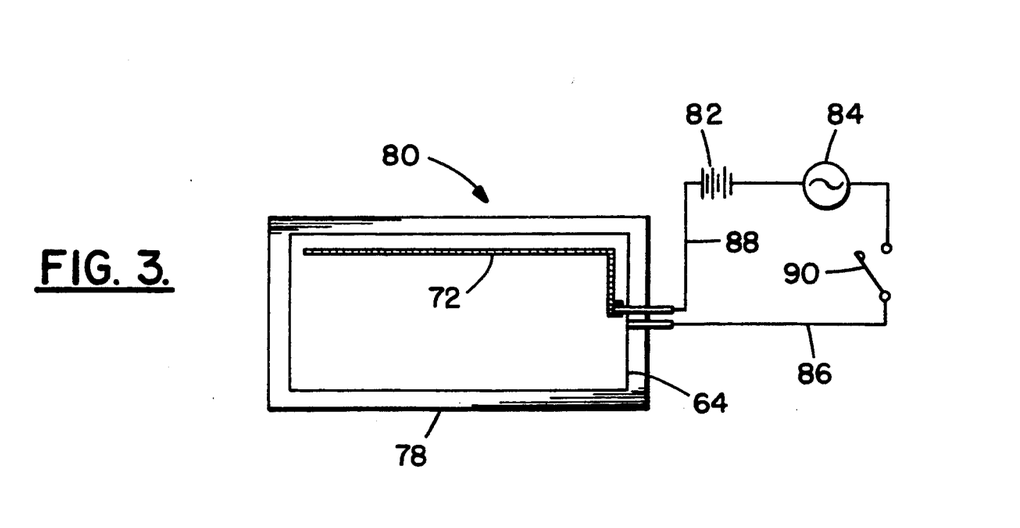
FIG. 3 is a schematic diagram of an electrical circuit for operating the embodiment depicted in FIG. 2.

Another embodiment of the invention is illustrated in FIGS. 2 and 3 which comprises modified flexible material 60 of the type according to which the luminescent material can be selectively energized to become luminescent. In this embodiment, the second layer 34 of luminescent material depicted in FIG. 1 has been replaced by a composite layered system 62 comprised of a plurality of sublayers which are bonded together in a suitable manner and encapsulated so as to be substantially hermetically sealed.

As seen in FIG. 2, a first electrode 64, typically of aluminum foil, has bonded thereto, first a plastic dielectric layer 66, then a phosphor layer 68 comprised in substantial part of zinc sulfide. The layers 66 and 68 may be screened onto the aluminum foil layer in a well known manner. Overlying the phosphor layer 68 is a transparent electrode 70 of suitable plastic such as a polyester film on an opposite surface of which is suitably deposited a second electrode 72 which may be in the form of a silver bus bar. A final layer 74 may be a suitable desiccant to eliminate moisture from the system 62.

Overlying and underlying the electrodes 64, 72 and their associated layered components are upper and lower caps 76, 78, respectively, which are peripherally bonded, as by heat sealing, to encapsulate all of the components and maintain them hermetically sealed. The caps 76, 78 may be composed of a polyester or other suitable plastic material. One material which has been found to be particularly desirable for the purpose is the copolymer polychlorotrifluoroethylene and polyvinylidene fluoride, one source of which is Allied Chemical Corporation of Morristown, N.J. which sells the material under the trademark "ACLAR".

Therefore, the composite layered system 62 is suitably bonded to the prismatic layer 22 in a manner similar to the bonding of the layer 34 to the layer 22 of the FIG. 1 embodiment.

Schematic electrical circuitry 80 is illustrated in FIG. 3 for operating the composite layered system 62. To this end, a battery 82 is provided as a source of d.c. voltage, or electromotive force. Electrically coupled to the battery is a suitable inverter 84 which converts the d.c. output of the battery to a.c. Leads 86, 88 of copper or other suitable material connect, respectively, to the electrodes 64, 72. A switch 90 can be manually or automatically operated, in some desired fashion, to thereby cause to be generated an electrical field across the phosphor layer 68 with the result that the phosphor layer thereby becomes luminescent.

As in the instance of the material 20, the life expectancy of the radiance from the composite layered system 62 is substantially extended when combined with the microprism material 22. This desirable and unobvious result is achieved because, with the construction disclosed, it is not necessary to electrically energize the phosphor layer 68 as frequently to obtain a desired energy output when the composite layered system 62 is employed with the electrical circuitry 80 as compared with the use of that system but without the prismatic layer 22.

Figure 4:
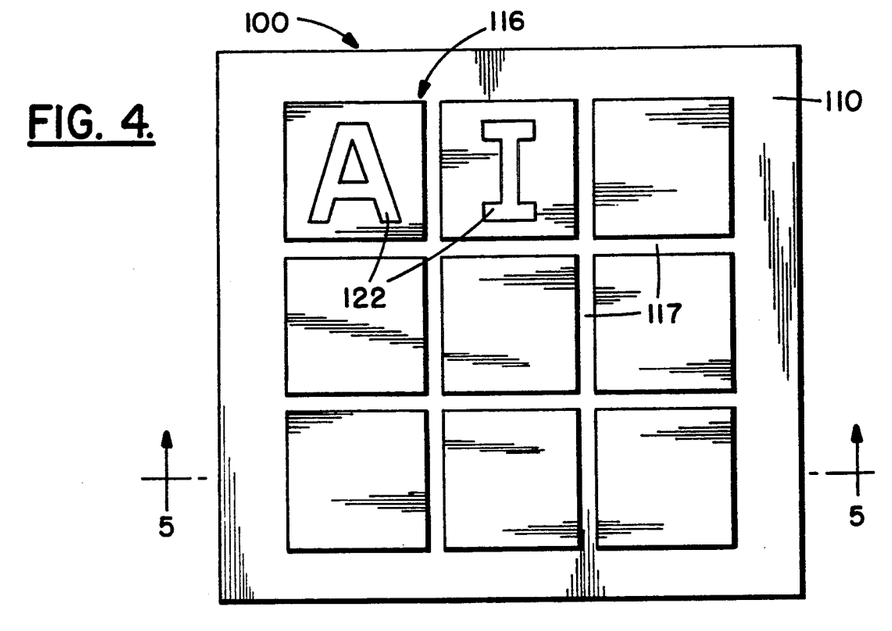
FIG. 4 is top plan view of another embodiment of the invention.
Figure 5:
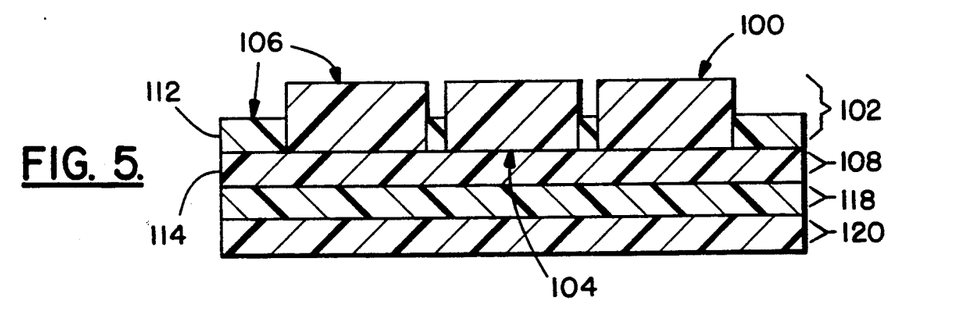
FIG. 5 is a diagrammatic cross section view taken generally along line 5—5 in FIG. 4.

Still another embodiment of the invention is illustrated in FIGS. 4 and 5 in the form of layered reflecting and luminous material 100. As in the instance of the FIG. 1 embodiment, the material 100 includes a first layer 102 of prismatic light reflective material which has an underlying surface 104 formed with a plurality of minute prism-like formations projecting therefrom at regular spaced intervals (not shown in detail in FIG. 5) and an overlying substantially smooth light transmissive surface 106. A second layer 108 of phosphorescent material is attached or joined to the underlying surface of prism-like formations and is generally coextensive with the first layer 102.

To effect this construction, peripheral edges 112, 114 of the layers 102, 108, respectively, are proximately positioned. Then, in a suitable manner, as by means of a die having a multi elevation surface, the material 100 is operated upon to join the first and second layers 102, 108 together along a continuous border 110 (FIG. 4) into a unitary structure in which the prism-like formations are substantially destroyed. The die may be, for example, of the heat sealing variety or of the type which can ultrasonically weld plastic materials together. With the aid of pressure applied to the die, in this manner, the border 110 of finite width is formed extending continuously along the peripheral edges 112, 114 and the prism-like formations coextensive with the border are thereby caused to be substantially destroyed. The border 110 encompasses and thereby defines a central region 116 at which the first layer and said second layer are physically distinct. In this condition, the undersurface of the first layer 102 may be contiguous with the adjacent surface of the second layer 108, or there may be a space between the surfaces. In either event, the interface between the layers at the central region 116 is isolated from the surrounding atmosphere and the prism-like formations retain their original configuration.

With this construction, in the central region 116, the material 100 simultaneously radiates phosphorescent light from the second layer 108 through the underlying surface 104 of prism-like formations and through the smooth light transmissive surface 106 and reflected light from the prism-like formations also passes through the smooth light transmissive surface 106 of the first layer. At the same time, only phosphorescent light radiates from the border 110.

The layers 102, 108 need not be joined only adjacent the peripheral edges 112, 114, but may be so joined interiorly as depicted by spacer zones 117 between adjacent regions 116. Wherever the layers 102, 198 are so joined, however, the prism-like formations are destroyed, transforming the layer 102 to a substantially transparent state, eliminating the reflective properties of that layer and enhancing the self-luminating properties of the layer 108.

Also in the manner of the material 20, a layer of pressure sensitive adhesive material 118 may be applied to a surface of the layer 108 opposite the layer 102. Further, to protect the adhesive layer 118 until such time that it is to be placed into service, a sheet 120 of suitable backing material is caused to be protectively adhered to said layer of the adhesive material. The backing sheet 120 can be removed from the layered material 120 whenever desired in order to enable the material to be attached to an underlying or supporting structure.

It will be appreciated that while the central regions 116 may be regularly shaped, in forms such as squares, rectangles, and the like, they may be of an infinite number of irregular designs. Additionally, indicia 122 may be formed in the material 100 to relate a desired message.

Figure 6:
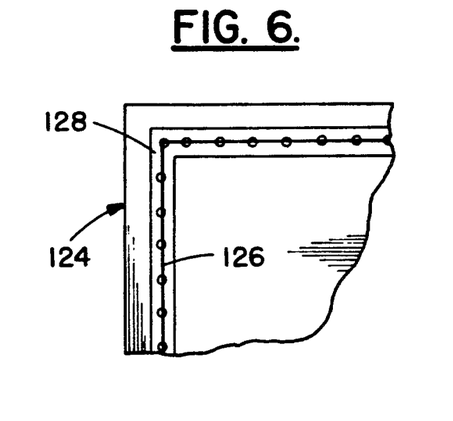
FIG. 6 is a detail top plan view of still another embodiment of the invention.

Although heat sealing and ultrasonic welding are preferred techniques for forming the border 110 and spacer zones, other techniques may be used to advantage. For example, as seen in FIG. 6, a modified version 124 of the layered reflecting and luminous material is depicted which utilizes thread or other suitable elongate material 126 in a sewing process for drawing together the light reflective and phosphorescent layers. A border 128 of finite width defines the region in which the prism-like formations of the light reflective layer are crushed or destroyed as in the material 100. The border 128 need not be located only adjacent the edges of the material 124 but are proximate the elongate material, wherever it is applied to the material.

Figure 7:
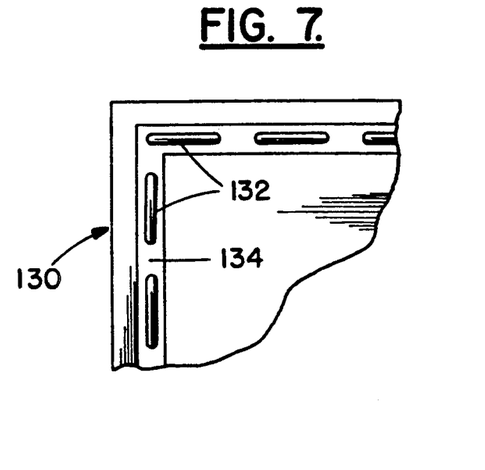
FIG. 7 is a detail top plan view of yet another embodiment of the invention.
Figure 8:
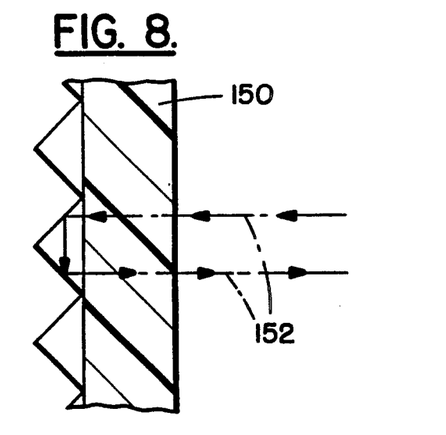
FIGS. 8 and 9 are detail diagrammatic cross sections views, respectively, illustrating physical characteristics of prismatic light reflective material.

Still another modified version 130 of the layered reflecting and luminous material is depicted in FIG. 7. In this instance, staples 132 or similar fasteners are employed for drawing together the light reflective and phosphorescent layers. Again, a border 134 of finite width defines the region in which the prism-like formations of the light reflective layer are crushed or destroyed as in the material 100. Also, as with the modified material 124, the border 134 need not be located only adjacent the edges of the material 130 but are proximate the aligned staples, elongate material, wherever they are applied to the material.

It will also be appreciated that in the instances of the material 100, 124, and 130, the layer 108 of luminescent material may be replaced by a composite layered system 62, then energized in the manner disclosed above with the aid of FIGS. 2 and 3.

For yet further embodiments of the invention, turn now to FIGS. 8-17. Retroreflective materials 150 utilizing cube corner formations of the type discussed above, possess a characteristic which is highly beneficial for the present invention although, at an earlier time, it was generally considered to be a significant drawback when considering such retroreflective materials by themselves. The property of retroreflective materials utilizing cube corner formations which enable such material to retroreflect requires that the light source being directed onto that material strike the surface in a substantially perpendicular manner. Viewing FIG. 8, the rays 152 of such light would, therefore, be directed onto the retroreflective surface generally within a range of approximately ±25° from perpendicularity and would reflect in a parallel fashion.

Figure 9:
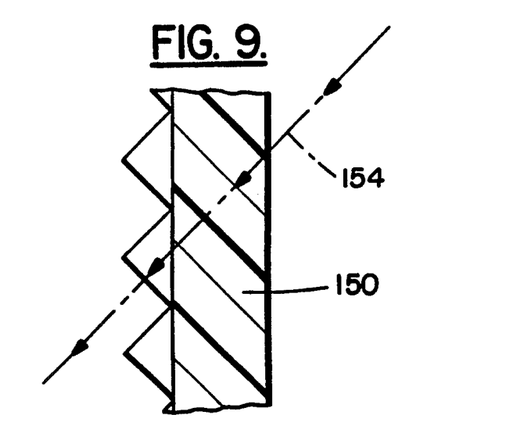

Outside of this range, when deflection angles become substantially larger, as seen in FIG. 9, the construction of retroreflective material 150 having cube corner formations is such that rays of light as represented at 154 are free to pass through the material 150 without substantial obstruction. This characteristic is used to the benefit of reflecting and luminescent layered material 156 (see FIGS. 10 and 11) depicting this latest embodiment of the present invention. As seen therein, the material 156 includes a layer of prismatic light reflective material 150 which has an underlying surface 158 formed with a plurality of minute prism-like formations projecting away therefrom at regular spaced intervals and an overlying, substantially smooth, light transmissive surface 160. The retroreflective material 150 extends to a peripheral edge 162.

As in previous embodiments of the invention, a layer 164 of phosphorescent material is attached to the underlying surface of prism-like formations and is generally coextensive with the retroreflective material 150. The layer 164 likewise extends to a peripheral edge 166 which is disposed proximately to the peripheral edge 162. In actual fact, the layers 150, 164 are joined together into a unitary structure along a border 168 (FIG. 10) of finite width which extends continuously along the edges 162, 166. At the border 168, the prism-like formations which are coextensive with the border are substantially destroyed by the process employed to join the layers together. The border 168 thereby encompasses and defines a central region, or cavity, 170 wherein the layers 150 and 164 are physically distinct and separated.

Figure 10:
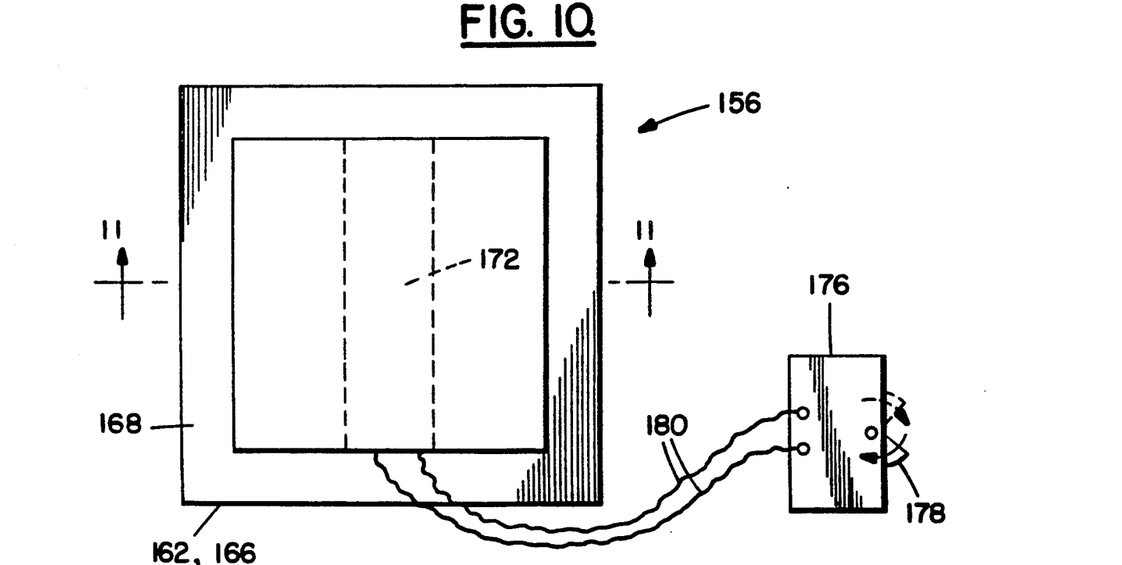
FIG. 10 is a diagrammatic top plan view of a further embodiment of the present invention.

Received within the central region 170 is an electroluminescent lamp 172 which has a luminescent surface 174 proximate the underlying surface 158 of the retroreflective material 150. The electroluminescent lamp 172 is preferably composed of flexible material having its own self contained power supply as diagrammatically indicated at 176. A commercially available lamp using so-called "thick-film" electroluminescence which has been found to be satisfactory for purposes of the invention is manufactured and sold under the trademark "LLS" by Loctite Luminescent Systems, Inc., a subsidiary of Loctite Corporation of Hartford, Conn. A manually operated switch 178 on the power supply 176 can be used for selectively energizing the lamp 172. As seen in FIG. 10, suitable encapsulated electrical leads 180 connect the power supply 176 to the lamp 172. Upon operation of the switch 178, the lamp 172 is energized and radiates through the underlying surface 158 of the prism-like formations and through the light transmissive surface 160. The power supply 176 may operate the lamp 172 either continuously or intermittently, as desired, so long as the switch 178 is moved to the "on" position.

Figure 11:
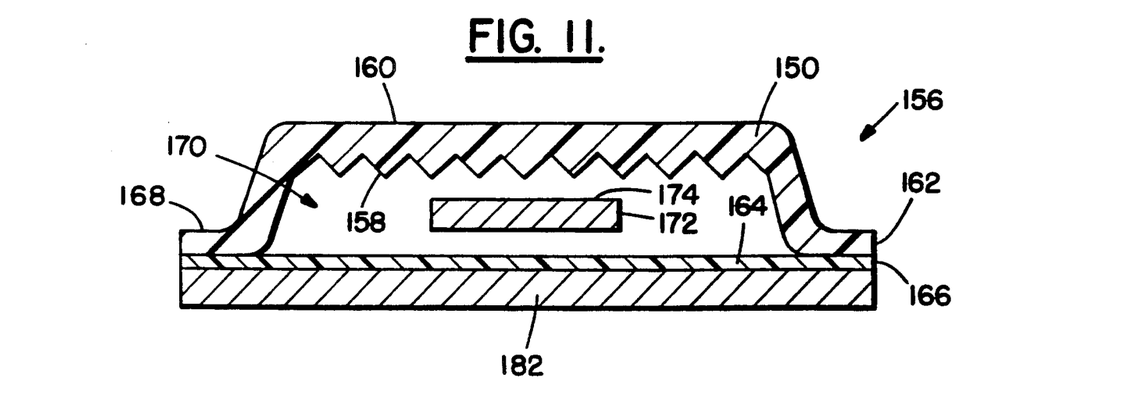
FIG. 11 is a cross section view taken generally along line 11—11 in FIG. 10.
Figure 12:
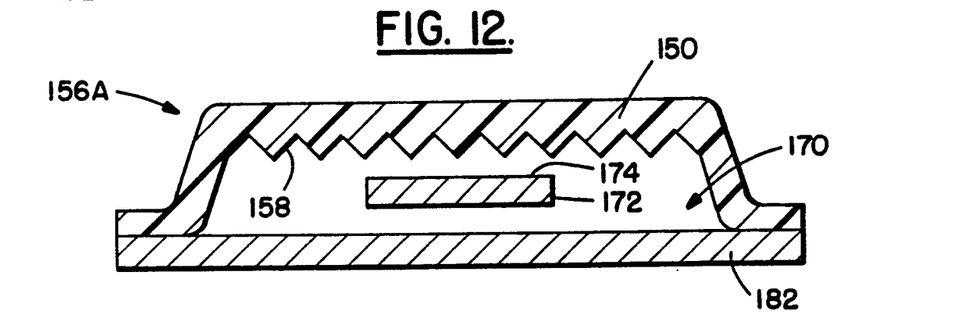
FIG. 12 is a cross section view, similar to FIG. 11, illustrating another embodiment of the material illustrated in FIG. 10.

It will be appreciated that during the period of time the lamp 172 is energized, light from its surface 174 will also be reflected from the underlying surface 158 onto the layer 164 of phosphorescent material. This serves to charge the phosphors in the passive phosphorescent material 164 such that when the lamp 172 is turned "off" a glow continues from the material 156 by reason of the layer 164 of phosphorescent material. This feature is particularly desirable in an application where there may have been a failure of the power supply 176, for example, in a darkened environment. The phosphorescent material 164 will have absorbed the light from the lamp 172 during the time that it was energized and, subsequently, produces a visible afterglow.

Although the presence of the layer 164 of phosphorescent material as indicated in FIG. 11 provides an additional feature of safety, there are applications where this additional feature might not be required. For example, in an out-of-doors application where there may not be total darkness, the phosphorescent material would not be readily visible. For such applications, it may be desirable to provide a modified construction of the material as indicated at 156A in FIG. 12. In this instance, the material 156A is of a simplified construction in which the retroreflective material 150 is suitably bonded to a backing member 182 which may be similar to the backing member employed in the construction depicted in FIG. 11. The backing member 182 may serve as the carrier for all of the other components of the material 156A and can be made of a variety of materials. It may, for example, be composed of vinyl, or fabrics, or other rigid or flexible supporting material. Indeed, the specific composition of the backing member 182 will not delete, change or diminish any of the functions of the material 156A, but is to allow the material 156A to be designed in a manner which can achieve the maximum quality of the product for each specific end use application to which it is assigned. In use, the material 156A would be used in the same manner as the material 156, the only difference being that there would be no afterglow once the lamp 172 had been extinguished.

Figure 13:
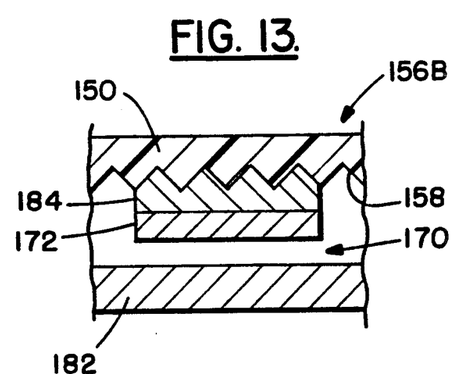
FIGS. 13 and 14 are detail cross section views depicting still other embodiments of the material illustrated in FIG. 10.

It has been recognized, in regard to retroreflective materials of the type indicated at 150 having an underlying surface of prism-like formations, that "wetting" the surface 158 will actually destroy their ability to retroreflect. Indeed, this occurs when transparent or translucent adhesives are applied to the surface 158. This phenomenon has been described in U.S. Pat. No. 4,801,193 to Martin. In FIG. 13, yet another modified version of the material of the invention is indicated at 156B which beneficially utilizes this characteristic feature of retroreflective materials. Specifically, it is desirable to anchor the lamp 172 so that it does not move to an undesirable extent within the central region 170. To this end, suitable adhesive 184 is employed to bond the lamp 172 to the retroreflective material 150. By reason of this construction, light from the lamp 172 shines through the material 150 with maximum brilliance without hinderance in any manner by the prism-like formations of the underlying surface 158. Of course, the remainder of the material 150 which is not adjacent the adhesive 184 continues to reflect when light is shined onto it.

Figure 14:
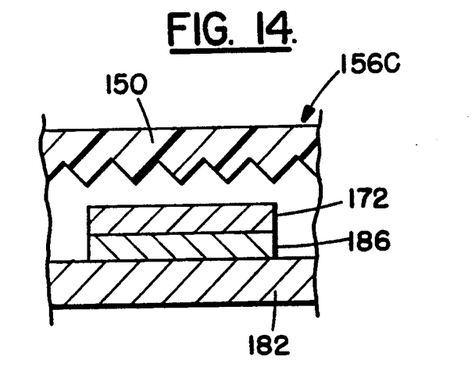

Still another variation of the invention is depicted in FIG. 14. In this instance, a layer 186 of suitable adhesive is employed to secure the lamp 172 to the backing member 182. However, in this instance, there is no modification of the reflectability of the material 150.

Figure 15:
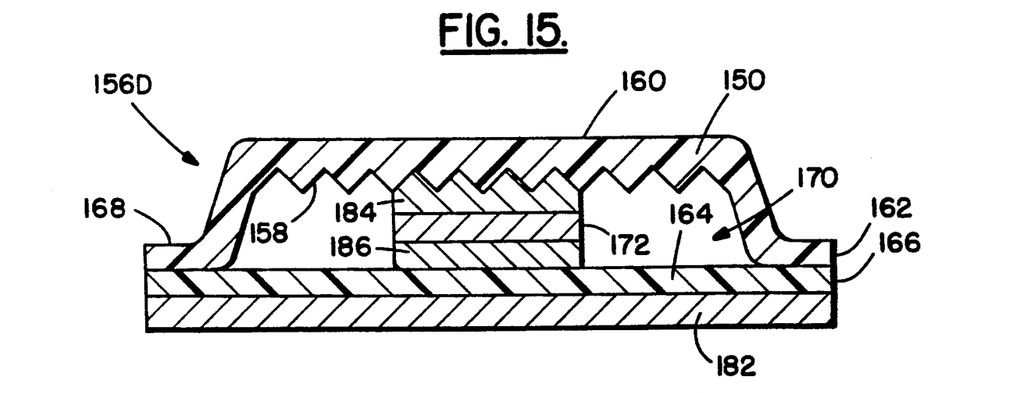
FIG. 15 is a cross section view, similar to FIGS. 11 and 12, illustrating still another embodiment of the material illustrated in FIG. 10.

Still another modification of the material of the invention is depicted in FIG. 15. In this instance, the material 156D comprises all of the components previously mentioned including retroreflective material 150, backing member 182, layer 164 of phosphorescent material on the backing member, the electroluminescent lamp 172 which is secured to the material 150 by the adhesive 184 and to the layer 164 by the adhesive 186.

Figure 16:
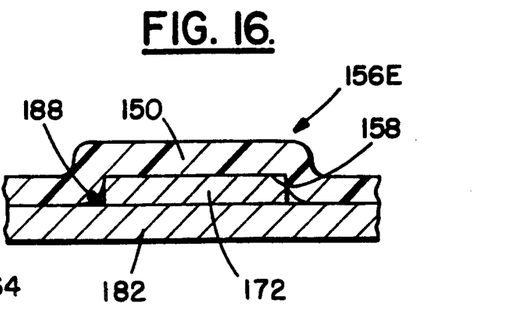
FIGS. 16 and 17 are cross section views illustrating still other modified embodiments of the material illustrated in FIG. 10.
Figure 17:
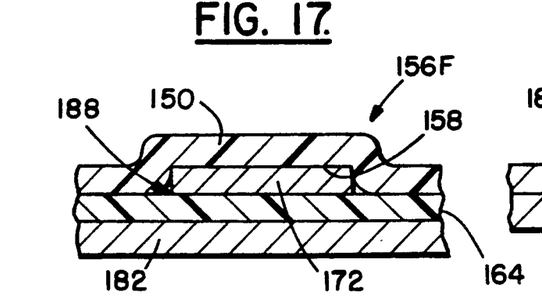

Still another modified form of the material of the invention is depicted as material 156E in FIG. 16. In this instance, the material 150 is suitably attached to the backing member 182 so as to define a modified central region 188 which is shaped and sized for fittingly receiving the lamp 172 therein. The lamp 172 is frictionally engaged by both the layer of material 150 and by the backing member 182 to thereby assure its firm support. In FIG. 17, modified material 156F is illustrated, similar to the material 156E of FIG. 16, but incorporating a layer 164 of the phosphorescent material. Of course, in either of the constructions of FIGS. 16 and 17, the underlying surface 158 may be "wetted" in a suitable manner to increase the brilliance of the light from the lamp 172 in the manner previously described with respect to FIG. 13.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. Reflecting and luminous layered material comprising:
   a first layer of prismatic light reflective material having an underlying surface formed with a plurality of minute prism-like formations projecting therefrom at regular spaced intervals and an overlying substantially smooth light transmissive surface, said first layer having a first peripheral edge; and a second layer of phosphorescent material attached to said underlying surface of prism-like formations and generally coextensive therewith, said second layer having a second peripheral edge;

said first and second peripheral edges being proximately disposed, said first layer and said second layer being joined together into a unitary structure along a border of finite width extending continuously along said first and second peripheral edges, said prism-like formations coextensive with said border being thereby substantially destroyed, said border encompassing and defining a central region whereat said first layer and said second layer are physically distinct;

an electroluminescent lamp within the central region having a luminous surface proximate said underlying surface of said first layer; and operative means for selectively energizing said electroluminescent lamp;

whereby, when said lamp is energized, light therefrom radiates through said underlying surface of prism-like formations and through said smooth light transmissive surface and, simultaneously, reflected light from said prism-like formations partially energizes said second layer of phosphorescent material; and whereby, when said lamp is deenergized, phosphorescent light radiates from said second layer through said underlying surface of prism-like formations and through said smooth light transmissive surface.

2. Reflecting and luminous layered material comprising:

a first layer of prismatic light reflective material having an underlying surface formed with a plurality of minute prism-like formations projecting therefrom at regular spaced intervals and an overlying substantially smooth light transmissive surface; and a second layer of phosphorescent material attached to said underlying surface of prism-like formations and generally coextensive therewith;

said layered material including a first region whereat said first layer and said second layer are joined together into a unitary structure such that said prism-like formations are substantially destroyed and a second region whereat said first layer and said second layer are physically distinct;

an electroluminescent lamp within the second region having a luminous surface proximate said underlying surface of said first layer; and operative means for selectively energizing said electroluminescent lamp;

whereby, when said lamp is energized, light therefrom radiates through said underlying surface of prism-like formations and through said smooth light transmissive surface and, simultaneously, reflected light from said prism-like formations partially energizes said second layer of phosphorescent material; and whereby, when said lamp is deenergized, phosphorescent light radiates from said second layer through said underlying surface of prism-like formations and through said smooth light transmissive surface.

3. Reflecting and luminous layered material as set forth in claim 2 including:

a layer of translucent adhesive material intermediate said luminous surface of said electroluminescent lamp and said underlying surface of said first layer for joining said lamp to said first layer and simultaneously rendering said first layer substantially transparent at a transmission zone proximate said luminous surface.

4. Reflecting and luminous layered material as set forth in claim 2 including:

a layer of adhesive material intermediate said electroluminescent lamp and said second layer for joining said lamp to said second layer.

5. Reflecting and luminous layered material as set forth in claim 3 including:

a layer of adhesive material intermediate said electroluminescent lamp and said second layer for joining said lamp to said second layer.

6. Reflecting and luminous layered material as set forth in claim 2 wherein said first and second layers are composed of vinyl.

7. Reflecting and luminous layered material as set forth in claim 6 wherein said second layer is joined to said first layer by any one technique including heat sealing, ultrasonic welding, sewing, and stapling.

8. Reflecting and luminous layered material as set forth in claim 2 wherein said first and second layers are in sheet form.

9. Reflecting and luminous layered material as set forth in claim 1 wherein the central region is shaped and sized for fittingly receiving said electroluminescent lamp therein, said electroluminescent lamp being frictionally engaged by said first layer and by said second layer, respectively.

10. Reflecting and luminous layered material comprising:

a substantially planar backing member;

a layer of prismatic light reflective material having an underlying surface formed with a plurality of minute prism-like formations projecting therefrom at regular spaced intervals and an overlying substantially smooth light transmissive surface, said layer having a peripheral edge; and said peripheral edge of said layer of light reflective material being joined to said backing member along a border of finite width extending continuously along said peripheral edge, said prism-like formations coextensive with said border being thereby substantially destroyed, said border encompassing and defining a central region whereat said layer and said backing member are physically distinct;

an electroluminescent lamp within the central region having a luminous surface proximate said underlying surface of said layer of light reflective material; and operative means for selectively energizing said electroluminescent lamp;

whereby, when said lamp is energized, light therefrom radiates through said underlying surface of prism-like formations and through said smooth light transmissive surface.

11. Reflecting and luminous layered material comprising:

a substantially planar backing member;

a layer of prismatic light reflective material having an underlying surface formed with a plurality of minute prism-like formations projecting therefrom at regular spaced intervals and an overlying substantially smooth light transmissive surface; and said layered material including a first region whereat said layer of light reflective material and said backing member are joined together into a unitary structure such that said prism-like formations are substantially destroyed and a second region whereat said layer and said backing member are physically distinct;

an electroluminescent lamp within the second region having a luminous surface proximate said underlying surface of said layer; and operative means for selectively energizing said electroluminescent lamp;

whereby, when said lamp is energized, light therefrom radiates through said underlying surface of prism-like formations and through said smooth light transmissive surface.

12. Reflecting and luminous layered material as set forth in claim 11 including:

a layer of translucent adhesive material intermediate said electroluminescent lamp and said layer of light reflective material for joining said lamp to said layer of light reflective material.

13. Reflecting and luminous layered material as set forth in claim 12 including:

a layer of adhesive material intermediate said electroluminescent lamp and said backing member for joining said lamp to said backing member.

14. Reflecting and luminous layered material as set forth in claim 11 wherein at least said layer of prismatic light reflective material is composed of vinyl.

15. Reflecting and luminous layered material as set forth in claim 14 wherein said layer is joined to said first backing member by any one technique including heat sealing, ultrasonic welding, sewing, and stapling.

16. Reflecting and luminous layered material as set forth in claim 11 wherein said layer of light reflective material and said backing member are in sheet form.

17. Reflecting and luminous layered material as set forth in claim 10 wherein the central region is shaped and sized for fittingly receiving said electroluminescent therein, said electroluminescent lamp being frictionally engaged by said layer of light reflective material and by said backing member.

* * * * *